(12) United States Patent
Thelin et al.

(10) Patent No.: US 12,460,356 B2
(45) Date of Patent: Nov. 4, 2025

(54) FASTENING DEVICE SYSTEM

(71) Applicant: SPARTAN MAT, LLC, Gilbert, AZ (US)

(72) Inventors: Justin Thelin, Gilbert, AZ (US); Aaron Allen, Gilbert, AZ (US); Scott Cooley, Vero Beach, FL (US); Burt Skiba, Mesa, AZ (US)

( * ) Notice: Subject to any disclaimer, the term of this patent is extended or adjusted under 35 U.S.C. 154(b) by 894 days.

(21) Appl. No.: 17/762,220

(22) PCT Filed: Mar. 2, 2021

(86) PCT No.: PCT/US2021/020534
§ 371 (c)(1),
(2) Date: Mar. 21, 2022

(87) PCT Pub. No.: WO2021/183331
PCT Pub. Date: Sep. 16, 2021

(65) Prior Publication Data
US 2022/0325481 A1    Oct. 13, 2022

Related U.S. Application Data

(60) Provisional application No. 62/988,393, filed on Mar. 11, 2020.

(51) Int. Cl.
*F16B 21/02*    (2006.01)
*E01C 5/00*    (2006.01)
*E01C 9/08*    (2006.01)

(52) U.S. Cl.
CPC ............. *E01C 5/005* (2013.01); *E01C 9/08* (2013.01); *F16B 21/02* (2013.01); *Y10T 403/7005* (2015.01)

(58) Field of Classification Search
CPC . E01C 5/005; F16B 5/10; F16B 21/02; Y10T 403/7005
See application file for complete search history.

(56) References Cited

U.S. PATENT DOCUMENTS

| | | | |
|---|---|---|---|
| 6,722,831 B2 * | 4/2004 | Rogers | F16B 21/02 411/553 |
| 9,068,584 B2 * | 6/2015 | McDowell | E02D 31/004 |
| 10,266,994 B2 * | 4/2019 | McDowell | F16B 5/0642 |
| 11,746,811 B2 * | 9/2023 | Jones | E01C 5/005 403/380 |
| 2004/0223828 A1 * | 11/2004 | Lazaruk | E01C 5/005 411/349 |

* cited by examiner

*Primary Examiner* — Michael P Ferguson
(74) *Attorney, Agent, or Firm* — Accelerate IP LLC

(57) ABSTRACT

A fastening device system for connection at least a first and a second overlapping mats placed on the ground wherein the first mat is aligned over at least one connecting hole of the second mat, the fastening device system comprising, a housing having a first half and a second half wherein the first half and second half are attached together forming the housing. A pin having a foot disposed at the lower end thereof and a shaft having a helical shelf that engages the helical channel of the housing. The pin is configured so that when it rotates 90° in one direction to the housing the pin draws the foot closer to bottom of housing and provides at least one locking position of the foot and locking the foot in place.

15 Claims, 13 Drawing Sheets

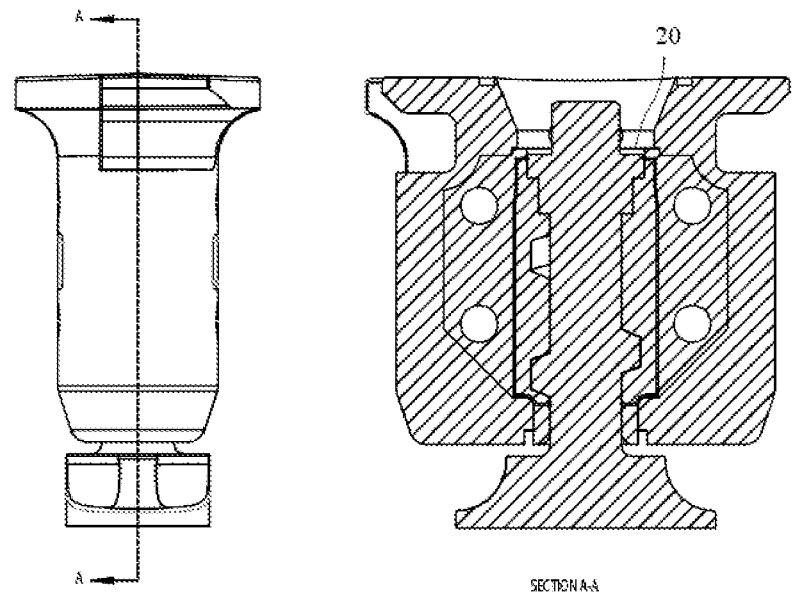
*FIG. 12a*  *FIG. 12b*
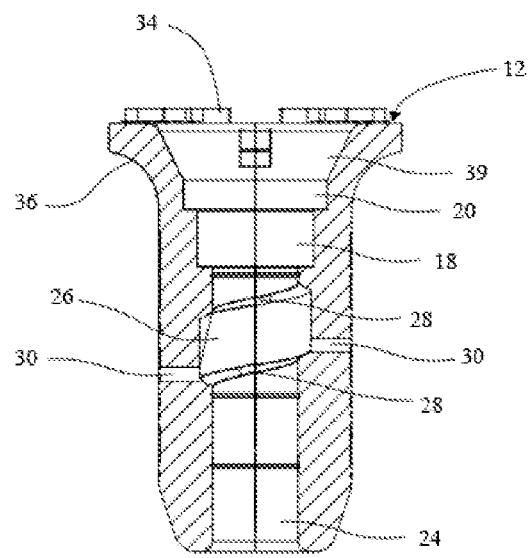
*FIG. 13*

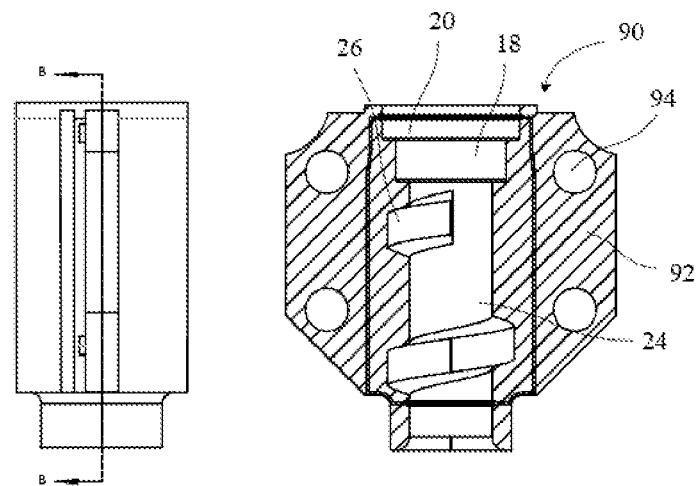
*FIG. 16*
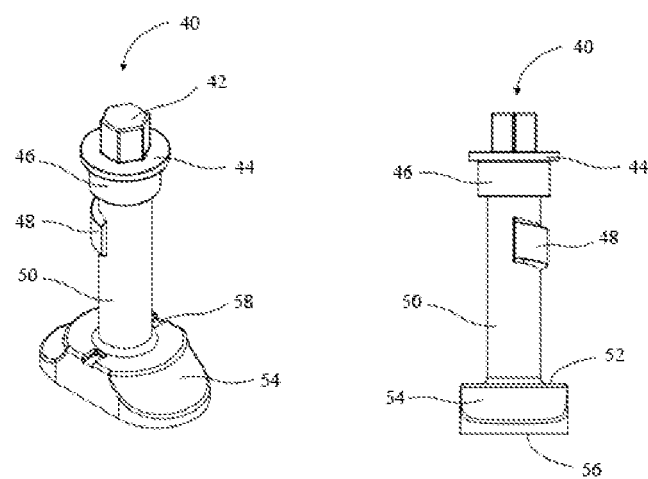
*FIG. 17a*  *FIG. 17b*

FASTENING DEVICE SYSTEM

CROSS REFERENCE TO RELATED APPLICATIONS

The present application claims the benefit under 35 U.S.C. 119 of U.S. Provisional Patent Application Ser. No. 62/988,393 filed Mar. 11, 2020. The U.S. Provisional Patent Application Ser. No. 62/988,393 is hereby incorporated by reference in its entirety.

TECHNICAL FIELD

The present specification relates to a fastening device, more particularly a mat fastening device system that connects two or more mats together.

BACKGROUND

There are many fastening devices for joining temporary and semi-permanent mats together. These mats are used for creating a structural surface for driveways, walkways, or for remote geographical locations. To cover large surface areas these mats are inter-connected together by removable connectors, also called locking pins or fasteners which are inserted into aligned connecting holes formed into the mat being connected together. Traditionally, the locking pins are inserted into connecting holes to align the adjacent mats and to keep the mats from separating when vehicles are driving across the surface. Many presently known locking pins only connect the mats together through a non-adjustable locking pin which allows for space between the connection point between the two mats.

In various known locking pins, the locking pins are not adjustable to form a tight connection between the adjacent mats and if the locking pins are adjustable there is not a locking mechanism on the pin's shaft allowing overtime the locking pins to loosing and for the mats to eventually come apart during use. During the manufacturing process and overtime the mats may become warped, thickness may vary, and the mat's may not be flat which is not ideal for connecting adjacent mats together. These types of variations in the mats may cause the locking pin holes to be misaligned or offset causing the mats to not be connected and if connected causing tension on pins which causes the locking pins to come loose. Furthermore, these locking pin body wears over time with constant use causing the pin to easily rotate out of position allowing the mats to come apart when a vehicle is driven over it. In addition, the locking pins are in environmental conditions that can vary from below freezing to extreme heat and humidity. These extreme temperature and environmental changes can cause the mats and the locking pins to expand and contract with the temperature conditions. Various known locking pins are solid pieces of plastic or metal which can expand and contract heavily with the environmental conditions causing the mats to separate during use.

It is advantageous for construction, walkways or other type of mats to be connected together using a mat fastening device that is not susceptible to wear overtime and use, and keeps the pin in its locked position so that the mats will stay connected together in every type of environmental condition.

SUMMARY

A fastening device system for connecting a first mat having a first tab with a first connecting hole to a second mat having a second tab with a second connecting hole, wherein the connecting holes have a width and a length that is greater than the width, the fastening device system comprising a housing that can have a first half attachable to a second half to form an outer surface outline. The housing can have a body portion configured to fit through the first and second connecting holes and a lip that extends beyond the circumference of the connecting holes.

A bore that can extend vertically through the body portion of the housing, the bore having a bottom, a wall, and at least one helical channel in the wall. A pin that can have a head end configured to be manipulated by a user, a shaft with at least one helical shelf extending from the shaft such that the shaft is configured to fit within the bore and the helical shelf is configured to fit within the helical channel, and a foot end that fits through the first and second connecting holes, but when rotated is wider than the width of the connecting holes such that when the housing is inserted into the first and second connecting holes and the pin is rotated the first tab is pressed down by the lip and the second tab is pushed up by the foot. The first half and the second half can further comprise a first overmold and a second overmold that is ultrasonically welded onto each half respectively. The lip has a tapered thru-hole extending between the top of the housing and the bore, wherein the head end of the pin resides substantially within the tapered thru-hole.

The housing has an outer surface and wherein the lip has at least one drainage hole extending from the thru-hole to the outer surface of the housing. The foot end and the head end of the pin have a greater circumference than the bore and wherein the head end is substantially flush with the bore and substantially seals the bore when the pin is in a closed position. The foot has a substantially flat bottom and wherein when the foot is in the unlocked position it has a foot outline that substantially matches the outer surface outline of the housing. The bore has a cap attached to it and wherein the cap engages with the head portion to prevent rotation of the pin relative to the housing. The cap comprises an anti-rotation mechanism and a recess wherein the anti-rotation mechanism is at least one tab within the recess. The housing provides at least one locking mechanism for the pin. The helical shelf of the pin engages the helical channel of the housing wherein the helical channel stops the pin from rotating essentially past a 90° rotation. The locking mechanism is located on the helical channel wherein the helical shelf comes into contact with the pin locking mechanism stopping the pin from rotating back to its unlocked position. The cap comprises a top and a base wherein the base has an attachment tab wherein the cap is removably attached to the housing by the attachment tab and the housing's cap lock. The pin is manufactured from carbon steel, aluminum or stainless steel. The housing is manufactured from high strength plastics.

A method of securing a first mat having a first tab with a first connecting hole to a second mat having a second tab with a second connecting hole, wherein the connecting holes have a width and a length that is greater than the width, the method comprising providing a pin having a head end configured to be manipulated by a user, a shaft with a helical shelf extending from the shaft and a foot end that fits through the first and second connecting holes, but when rotated is wider than the width of the connecting holes. Providing a housing having a first half attachable to a second half to form a housing having an outer surface outline, wherein the housing has a body portion configured to fit through the first and second connecting holes and a lip that extends beyond the circumference of the connecting holes, wherein the housing has a bore extending vertically through the body portion of the housing, the bore having a bottom, a wall, and at least one helical channel in the wall. Placing the pin within the bore such that the helical shelf fits within the helical channel and attaching the first half to the second half. Inserting the housing through the first and second connecting holes. Rotating the pin to compress the first mat to the second mat between the lip and the foot end. Ultrasonically welding a first overmold to the first half and a second overmold to the second half.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for" and will also recite the word "function" (i.e., will state "means for performing the function of . . . , without also reciting in such phrases any structure, material or act in support of the function. Thus, even when the claims recite a "means for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

FIG. 12a is a side view of a fastening device system thereof in accordance to one, or more embodiments;

FIG. 12b is a cross-sectional view of a fastening device system in its open and closed position in accordance to one, or more embodiments;

FIG. 13 is a cross-sectional view of the housing omitting the pin of a fastening device system thereof in accordance to one, or more embodiments;

FIG. 16 is a cross-sectional view of an overmold of a fastening device system thereof in accordance to one, or more embodiments;

FIG. 17a is an isometric view of a pin of a fastening device system thereof in accordance to one, or more embodiments;

FIG. 17b is a side view of a pin of a fastening device system thereof in accordance to one, or more embodiments;

DETAILED DESCRIPTION

Figure 1:
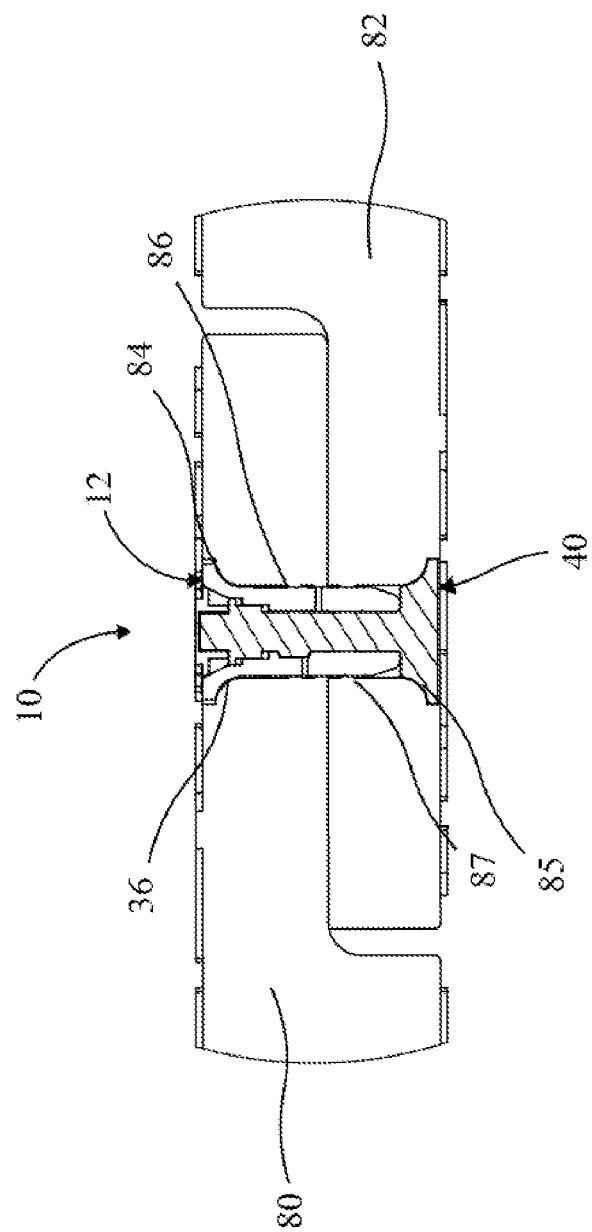
FIG. 1 is a cross-sectional view of a fastening device system thereof in accordance to one, or more embodiments.

Referring initially to FIG. 1, an embodiment of a fastening device system is shown generally at 10. The fastening device system 10 can secure a first mat 80 and a second mat 82 together wherein the first mat and second mat can partially overlap each other having at least one elongated or partially elongated hole 86 that can accept a mat fastening device. The illustrated mats 80, 82 are composite mats, such as the System7® mats currently sold by the Applicant and useful, for example, creating usable surfaces, temporary road access, work platforms, environmental containment platforms or the like. However, the present disclosure is not limited to this type of mat. As used herein the term mat and any variation thereof can include for example, boards, wood planks, mats, sheets, or other such work structures that can be connected together. The fastening device system 10 can be placed into the first mat 80 and second mat's 82 first connecting hole 86 and second connecting hole 87 wherein the first connecting hole and second connecting hole can be elongate holes which can have a first tab 84 and a second tab 85 with a first connecting hold and a second connecting hole that can extend around both the upper surface and the lower surface of the hole. The connecting holes 86, 87 can have a width and a length that is greater than the width of the fastening device 10. The first tab 84 can be machined to match the radius of a housing's upper support 36 and a foot 54. The mats 80, 82 are at least substantially identical, or mirror images of each other and, thus, are reversible. In other words, the hole 86 and the radius lip of the first mat 80 can be generally the same as the hole and first tab 84 and second tab of the first mat 80 and the second mat 82.

The fastening device system 10 can be configured to extend through the first mat 80 and second mat 82 wherein the connecting holes 86 can be configured to prevent rotation of the housing within the holes. For example, the first mat 80 and second mat 82 can have a hole 86 that is asymmetrical in shape such as square, rectangular, hexagonal, or the like which can prevent the fastening device system 10 from rotating within the holes. In addition, the first connecting hole 86 and second connecting holes 87 can vary in thickness to allow for a tighter tolerance fit of the mat fastening device 10 or to accommodate different thicknesses of the mat fastening device. However, the fastening device system 10 and/or first connecting hole 86 and second connecting holes 87 can be any suitable mechanism that can prevent rotation of the housing within the first connecting hole and second connecting holes.

Figure 2:
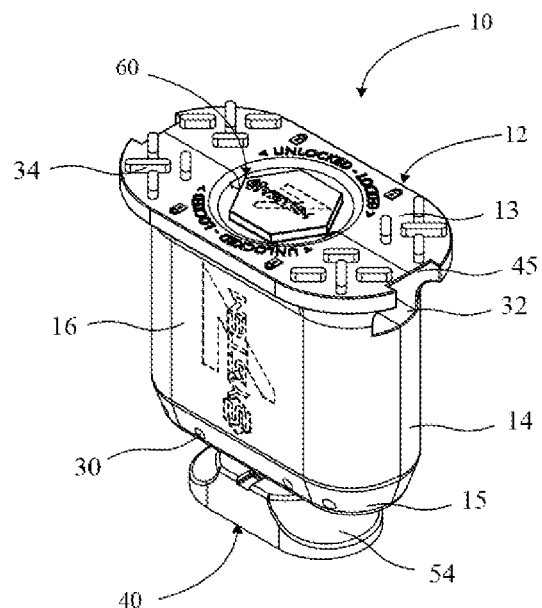
FIG. 2 is an iso-metric view of a fastening device system thereof in accordance to one, or more embodiments.
Figure 3:
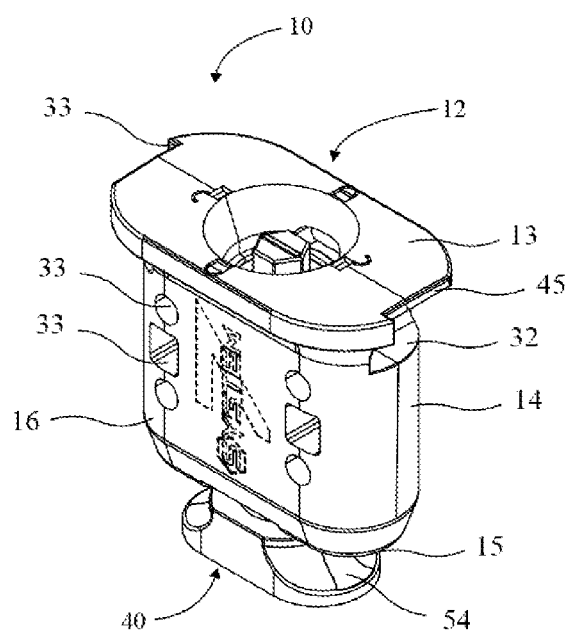
FIG. 3 is an iso-metric view of another embodiment of fastening device system thereof in accordance to one, or more embodiments.
Figure 10:
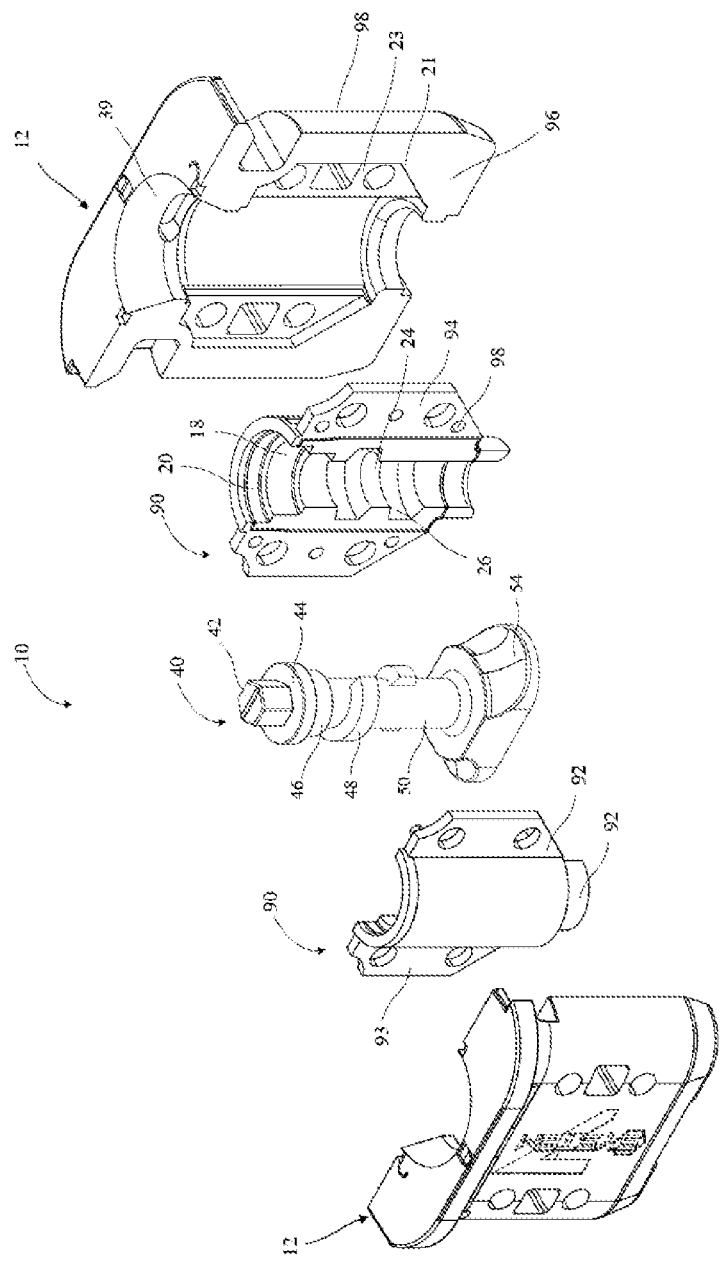
FIG. 10 is an isometric-exploded view of a fastening device system thereof in accordance to one, or more embodiments.
Figure 11:
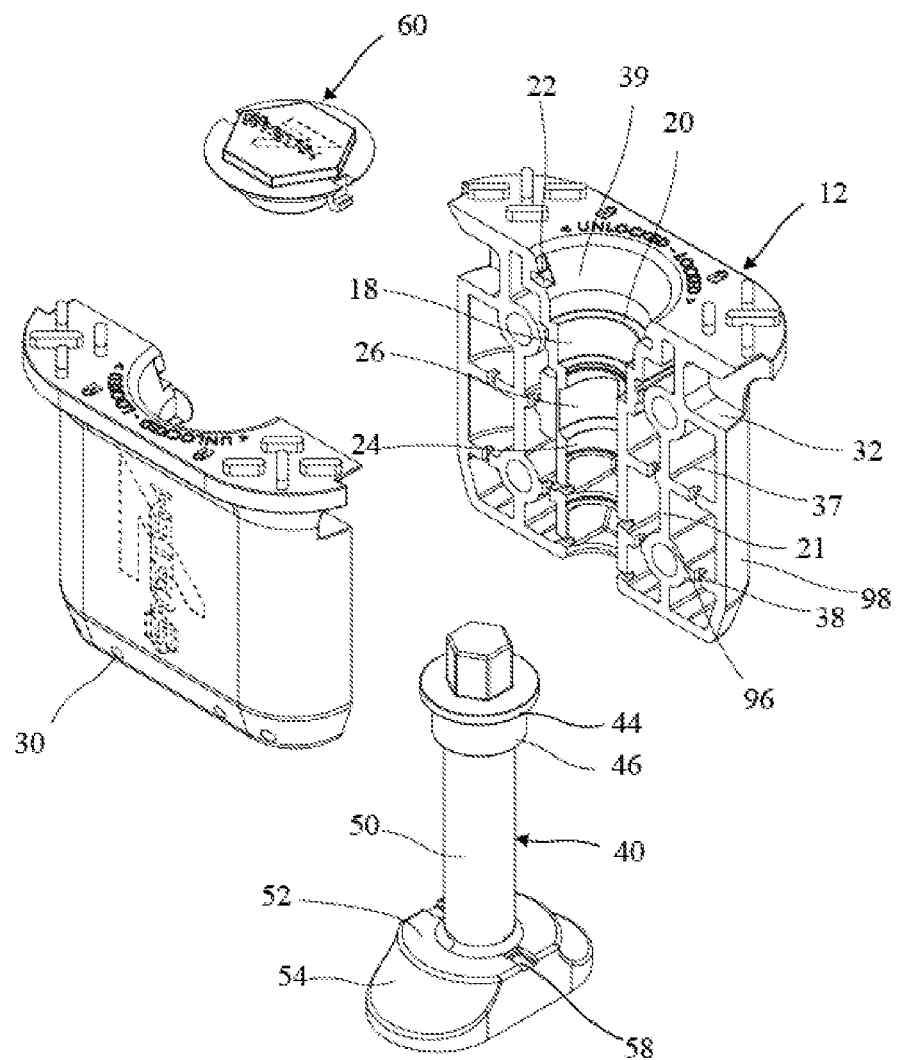
FIG. 11 is an isometric-exploded view of another embodiment of a fastening device system thereof in accordance to one, or more embodiments.

Referring to FIGS. 2-3, the fastening device system 10 comprises a housing 12 having a first half 14 and a second half 16 having a wall 96 and an outer surface 98 wherein the housing has an upper end 13 and a lower end 15 wherein the first half and the second half are attachable forming the housing. The first half 14 and the second half 16 can be laser welded, ultrasonic welded, induction welded, high frequency welded, adhesive bonding, solvent bonding, UV bonding, fasteners, or the like. A pin 40 can be placed between the first half 14 and the second half 16 wherein the housing 12 can be configured to accept the pin. The pin 40 can be rotatable relative to the housing 12 and the first mat and the second mat 80, 82 (as shown in FIG. 1) when the fastening device system 10 is engaged therewith. The pin 40 having a head end configured to be manipulated by a user, a shaft with at least one helical shelf 48 extending from the shaft 50 such that the shaft is configured to fit within the bore 24 and the helical shelf is configured to fit within the helical channel 26, and a foot end 54 that fits through the first and second connecting holes, but when rotated is wider than the width of the connecting holes such that when the housing is inserted into the first and second connecting holes and the pin is rotated the first tab is pressed down by the lip and the second tab is pushed up by the foot as shown in FIGS. 10 and 11. The housing 12 can be manufactured from any suitable material such as high-strength, mold, thermoplastic, casted metal, or the like.

In certain embodiments any excess material in the housing 12, from both the first half 14 and second half 16 can be removed to reduce weight and allow for expansion and contraction as environmental conditions change, as shown in FIG. 10, wherein series of weight reduction cut-outs 37 in the inner core 21 of the housing 12 can be added wherein the cut-outs can be mirror images of each other on the first half 14 and the second half 16. The cut-outs 37 maybe different shapes and thicknesses to accommodate different environmental conditions and weight savings within the fastening device system 10. However, it should be noted that the shape of the housing 12 and form of weight reduction cut-outs 37, if included, are not limited to the present disclosure.

Figure 4:
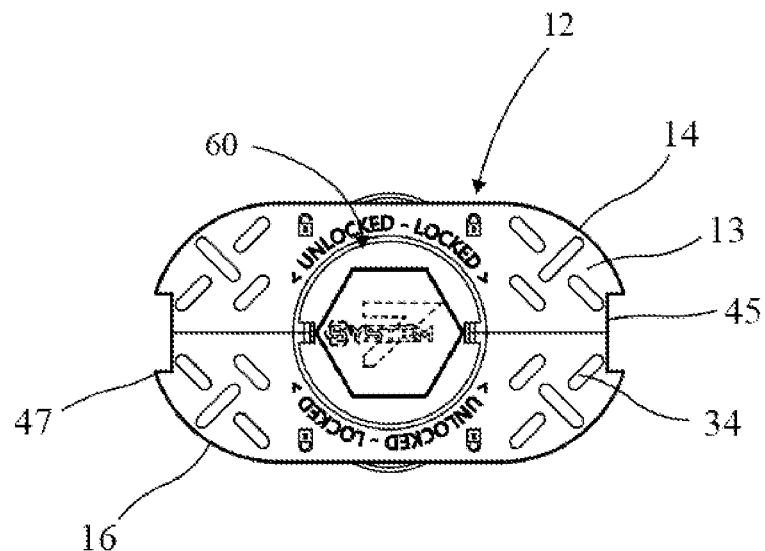
FIG. 4 is a top view of a fastening device system thereof in accordance to one, or more embodiments.
Figure 5:
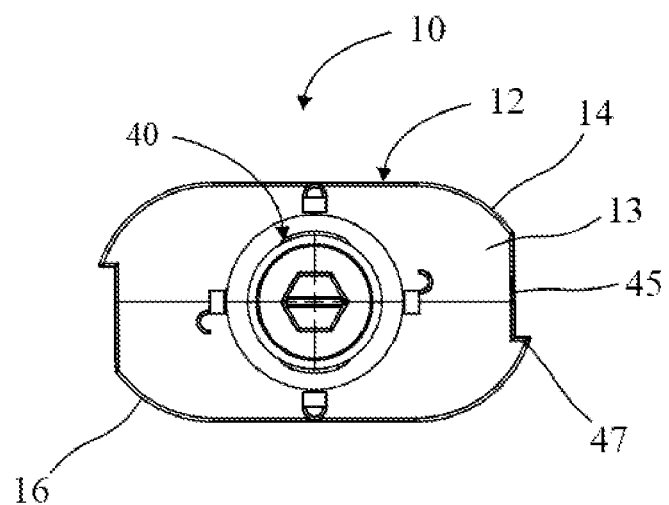
FIG. 5 is a top view of another embodiment of a fastening device system thereof in accordance to one, or more embodiments.

Referring to FIGS. 4 and 5 shows a top view of two different embodiments of the fastening device system 10 wherein the first half 14 and the second half 16 can further comprise at least one extraction tool attachment point 45 which can allow the extraction tool (not shown) access to at least one receiver as shown in FIGS. 2 and 3. The extraction tool attachment point 45 can be partially cut out of the top surface creating at least one stop 47 having a substantially right angle for the extraction tool to clamp onto, attach to or act as a stopping point keeping the extraction tool from rotating, wherein the extraction tool can grip the mat fastening device for easy installation or removal of the fastening device system 10. The extraction tool attachment point 45 may be any suitable form, configuration, operation and location. The at least one receiver 32 can be adapted to receive an extraction tool (not shown) that can insert or remove the fastening device system 10 from the first and second mat 80, 82 hole 86 (shown in FIGS. 1 and 3). The receiver 32 may have any suitable form, configuration, operation and location. The receiver 32 can include a pair of angularly oriented extractor recesses extending from the outside of the housing 12 towards a bore 24, as shown in FIGS. 10 and 11, and extending down from the top surface 13. The receiver 32 can be located anywhere on the top surface 13. In certain embodiments, the first half 14 and the second half 16 can further comprise at least one tread 34 that can extend from the upper end 13 of the first half and the second half. In other embodiments, the tread 34 can be omitted.

Figure 6:
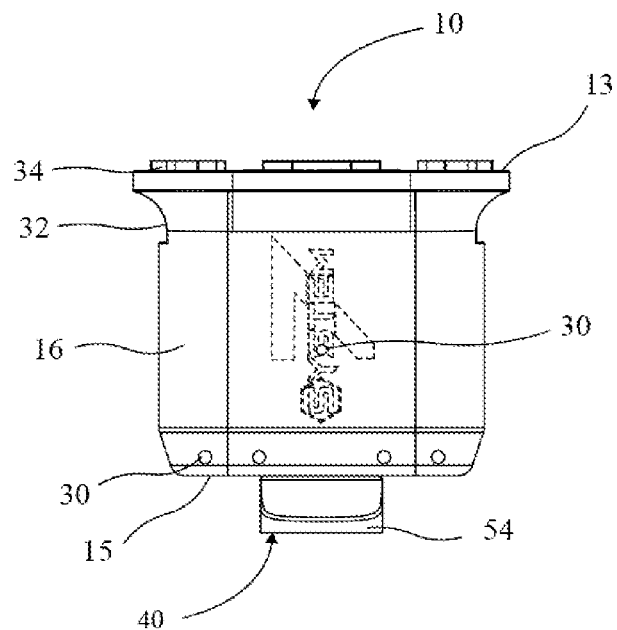
FIG. 6 is a front view of a fastening device system thereof in accordance to one, or more embodiments.
Figure 7:
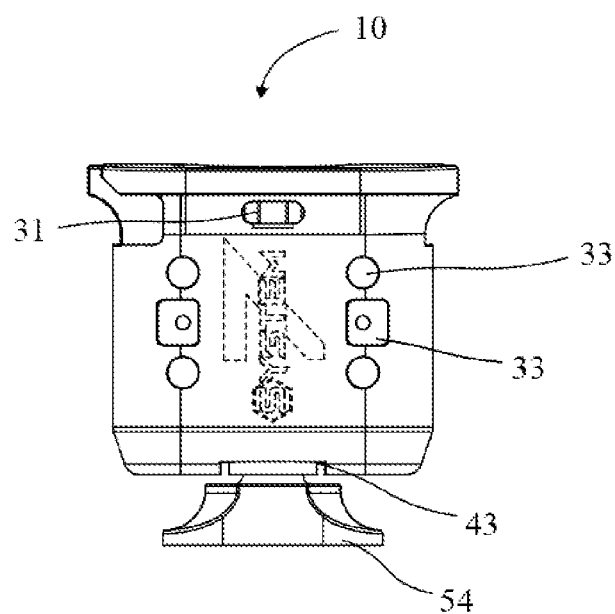
FIG. 7 is a front view of another embodiment of a fastening device system thereof in accordance to one, or more embodiments.

Referring to FIGS. 6 and 7 showing a side view of two different embodiments of the fastening device system 10 in its closed position, FIG. 6, and its open position, FIG. 7. The first half 14 and the second half 16 can further comprise at least one drain hole 30 wherein the drain hole can be thru holes that are located at various locations on the housing that allows debris such as dirt, water, ice, or other contaminants to escape from the top of the fastening device system 10 allowing the user to push the contaminants out through the first drain and second drain when tightening or loosening the fastening device system 10 on the mats. In the preferred embodiment the drain hole 30 can be located substantially near an upper bore 39 as shown in FIG. 10. The drain hole 30 may have any suitable form, configuration, operation and location. In other embodiments the drain hole 30 can be located substantially near the lower end 15 of the housing and the drain hole can extend inwardly, wherein the drain hole can be located near or around the lower end 15 wherein the drain hole 30 can extend from the outer surface of the housing towards the inner core or can be thru holes extending from the outer surface of the first half 14 and continuing through the housing 12 to the second half's 16 outer surface. The drain holes 30 may be any suitable form, configuration, operation and location. The drain holes 30 can allow for the housing 12 to expand and contract in different environmental conditions and to allow for liquid and other contaminants to escape from the housing 12. In certain embodiments the drain holes 30 can be omitted from the housing 12.

Figure 8:
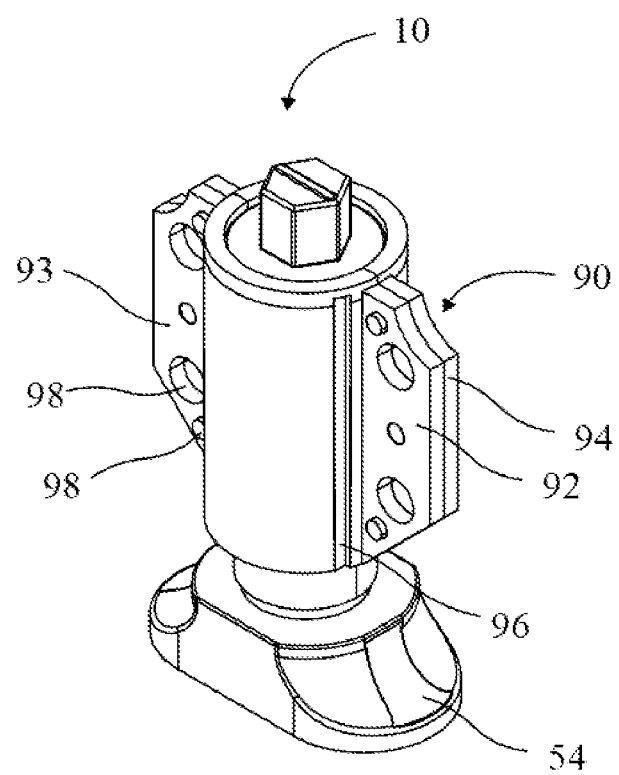
FIG. 8 is an isometric view of a pin and an overmold of a fastening device system thereof in accordance to one, or more embodiments.
Figure 9:
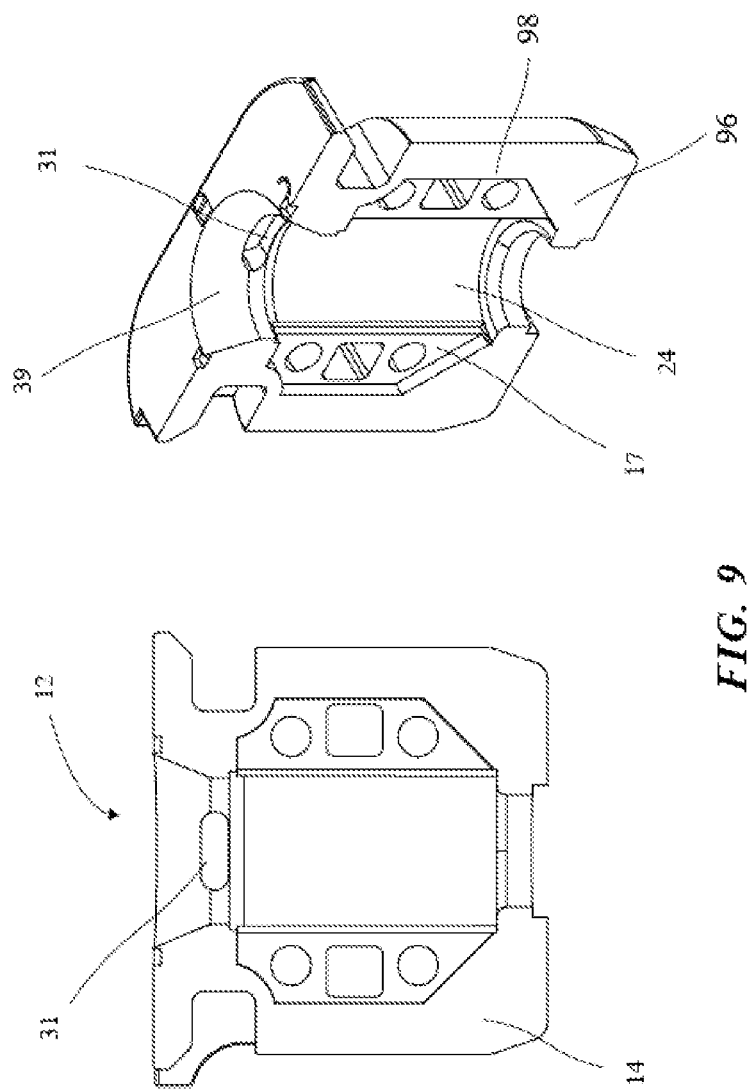
FIG. 9 is an isometric view of the first half of the housing of a fastening device system thereof in accordance to one, or more embodiments.

Referring to FIG. 8-10 the housing 12 can further comprise an upper bore section 24 wherein the upper bore section can gradually decrease in size as it extends vertically towards the lower end from the upper end to a seal 20. The upper bore section 39 can be sized so that the wrench can easily access the pin 40 and can allow the user to lock or unlock the pin from the mats. In certain embodiments, the fastening device system 10 can further comprise a first overmold 92 and a second overmold 94. The first half 14 and the second half 16 can comprise a first cavity 23 and a second cavity 25 having a bore section 24 wherein the first cavity and the second cavity are shaped to fit the first overmold 92 and the second overmold 94 wherein the second cavity can be a mirror image of the first cavity. The first overmold 92 can be attached to and formed into the first cavity 23 and the second overmold 94 can be formed into and attached to the second cavity 16 each forming its own halves respectively as shown in FIGS. 12a and 12b. The first overmold 92 and the second overmold 94 can be attached to the first cavity 23 and the second cavity 16 by any suitable manufacturing processes. The first overmold 92 and second overmold 94 can add thickness and strength to the fastening device system 10 wherein without the first overmold and second overmold as the pin 40 rotates within the fastening device system 10 the pin is prone to tearing out of and wearing down the first half 14 and the second half 16. The first overmold 92 and second overmold 94 can be manufactured from, but not limited to, glass filled nylon, plastics, metals, or the like.

The fastening device system 10 can further comprise at least one helical channel 26 located within a bore 24 that can be disposed on the first and second overmold 94, 96 or on the first half 14 and the second half 16 as shown in FIG. 11. The bore can extend vertically through the body portion of the first half 14 and the second half 16 of the housing 12 wherein the bore can have a bottom, a wall 96 and at least one helical channel 26 disposed on the wall. The bore 24 can have a diameter that extends from the upper end 13 to the lower end 15. The bore 24 can comprise at least one helical channel 26 and can extend vertically from the bore head 18 and the inner seal 20. The helical channel 26 can rotate such as, for example, between 45 inches and 120 degrees, more preferably a width of between 60 and 110 degrees, and still more preferably a rotation of approximately 90 degrees or the like. The helical channel 26 can be a variety of shapes such as, for example, square, rectangular, circular, or the like having radius or chamfered inner corners.

The fastening device system 10 can further comprise a bore head 18 which can be disposed on the first overmold 94 and the second overmold 96, or on the first half 14 and the second half as shown in FIG. 11, wherein the bore head can be substantially near the seal 20 extending downwardly axially from the seal sized to accommodate a head 46 of the pin 40, or more preferably the bore head can extend from the bore to the upper bore section 37 wherein the upper bore section can have a wider opening at the upper end 13 wherein the upper bore section can be a tapered thru-hole extending between the top of the housing 12 and the bore 24 wherein the head end 46 of the pin 40 resides substantially within the tapered thru-hole. The bore head 18 can extends vertically about the bore's 24 axis beyond the profile of the bore and the inner seal 20 extends axially beyond that of the bore head.

In certain embodiments the first half 14, the second half 16, the first cavity 23 and the second cavity 25 can comprise at least one hole 33 which can assist in the manufacturing process such as, allowing the mold to open and close, allowing the manufacturer to load the inside of the housing into the overmold cavity, and to hold the first half and the second half in the proper location during the overmold process as shown in FIGS. 9 and 10. In other embodiments, the holes 33 can be omitted from the fastening device system 10 as shown in FIG. 11.

Referring to FIGS. 10 and 11, the pin 40 can be placed between the first half 14 and the second half 16. In certain embodiment the fastening device system 10 can comprise a cap 60 wherein the cap 60 can be placed into the upper end 13 of the housing 12 and can lock into place with a cap lock 22. The cap lock 22 can allow for the cap 60 to snap onto the housing 12. The cap 60 can be attached to the cap lock 22 by for example, hook and snaps, fasteners, dowel pins, snaps, or the like. The cap lock 22 can be any suitable form, configuration, and operation. In other embodiments, the cap 60 can be omitted.

In certain embodiments the housing 12 can further comprise at least one tread 34 the extends vertically from the upper end 13 wherein the tread can vary in thickness and length and can be any suitable shape or any suitable pattern. In exemplary embodiment, the tread can have the same pattern as the pattern on the System7™ mats currently sold by the Applicant. In other embodiments the tread 34 can be omitted as shown in FIG. 10. The housing's 12 upper support 36 can be positioned atop the first or second mat 80, 82 overlapping the first tab 84 and/or second tab 85. The upper support 36 can be the same shape or any suitable shape that can create seal between the housing the lip of the first mat 80 or the second mat 82. In certain embodiments, the housing 12 can be manufactured from at least one piece.

Figure 14:
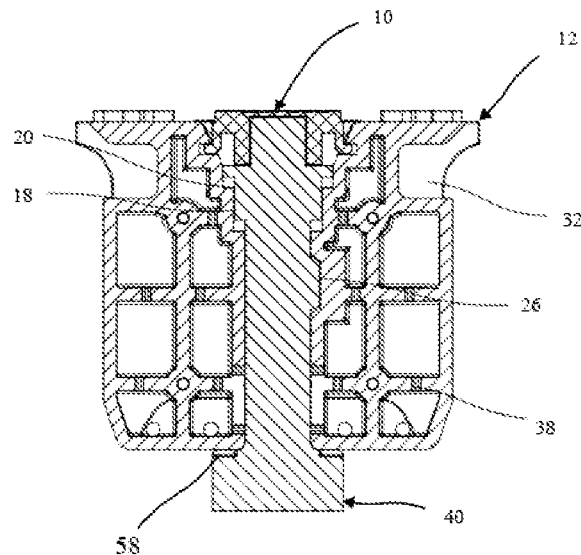
FIG. 14 is a cross-sectional view of another embodiment of a fastening device system thereof in accordance to one, or more embodiments.
Figure 15:
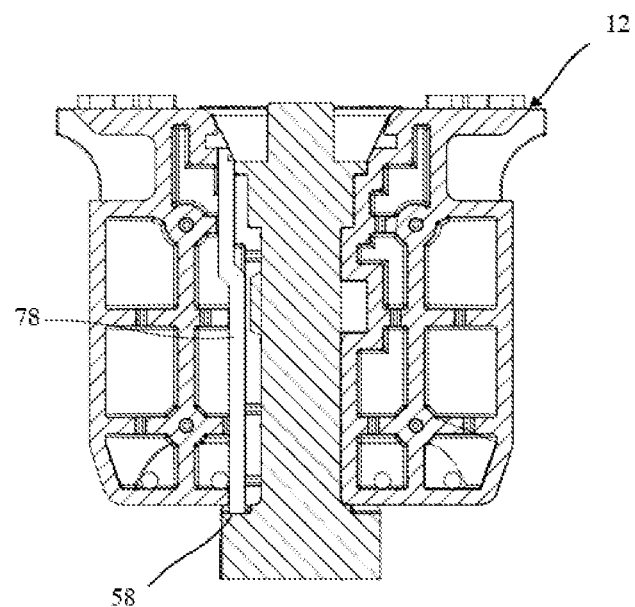
FIG. 15 is a cross-sectional view of another embodiment of a fastening device system thereof in accordance to one, or more embodiments.
Figure 18A:
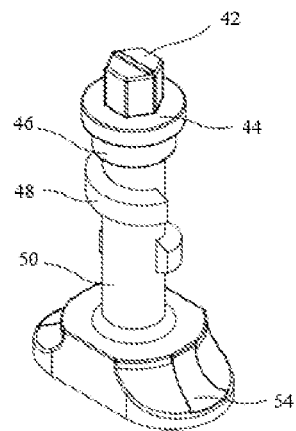
FIG. 18a is an isometric view of another embodiment of a pin of a fastening device system thereof in accordance to one, or more embodiments.
Figure 18B:
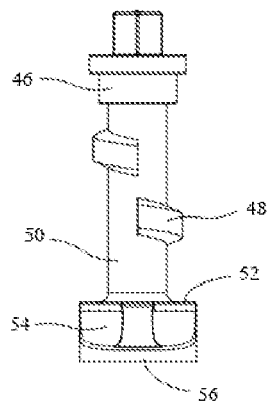
FIG. 18b is a side view of another embodiment of a pin of a fastening device system thereof in accordance to one, or more embodiments.
Figure 18C:
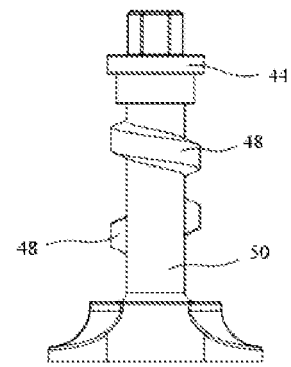
FIG. 18c is a front view of another embodiment of a pin of a fastening device system thereof in accordance to one, or more embodiments.

Referring to FIG. 17a through 18c the pin comprising at least one foot 54 disposed at its lower end 56 and a shaft 50 wherein the shaft has at least one helical shelf 48 disposed on its outer diameter. As shown in FIGS. 12b and 14 the pin can be engaged in the bore 24 and the helical channel 26 of the housing 12, the foot 54 is positioned below the lower end 15 of the housing. The foot 54 can be aligned with the housing 12 wherein the foot can be positioned below the hole 86 of the second mat 82, and as the user rotates the pin the foot engages the first mat 80 or the second mat 82 first tab 84 as shown in FIG. 1. The foot end 54 and the head end 46 of the pin have a greater circumference than the bore and wherein the head end is substantially flush with the bore 24 and substantially seals the bore when the pin is in a closed position In embodiments the pin 40 can further comprise a male socket 42 wherein the socket can be male, or female hexagonal socket. In the exemplary embodiment, as the user rotates the pin 40, by the socket 42, the pin can be guided along the helical channel 26 and allowed to rotate at least 90° wherein when the pin's helical shelf 48 rotates up and down along the housing's 12 helical channel 26 allowing the foot 54 to engage the first mat 80 or the second mat's 82 radius lip as shown in FIG. 1. The helical shelf 48 can transfer the load from securing the first mat 80 and second mat 82 together to the housing 12 through the helical channel 26 and helical shelf 48 increasing the strength of the fastening system 10. The foot 54 can have an outline that substantially matches the outer surface outline of the housing 12. The foot 54 can be any suitable form, configuration and operation. In embodiments, the foot 54 has an outer shape that can be the generally radius or forms substantially the same shape as the first mat 80 or second mat's 82 first tab 84 and second tab 85 and extends outwardly from the shaft 50, or in other embodiments the foot 54 can be a cam shape where it can have a larger thickness near the middle of the foot that tightens on the second mat or first mat radius. The bottom of the foot 54 is at least substantially flat, while the top 52 generally connects to the shaft 50 wherein there can be a radius where the shaft and the top transition relieving the stress between the shaft and the foot.

Figure 20:
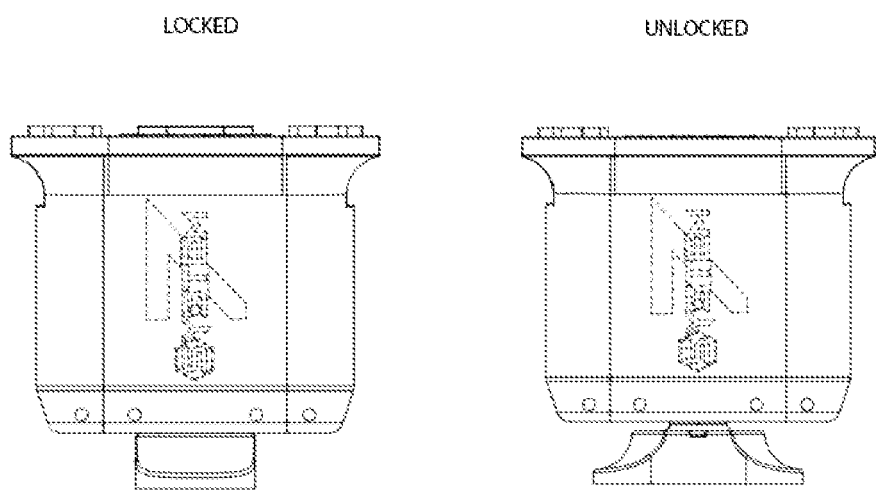
FIG. 20 is a side view of a fastening device system in its locked and unlocked positions thereof in accordance to one, or more embodiments.

The foot 54 is rotatable between at least two positions relative to the housing 12 as the pin 40 is rotated. In at least a first position as shown in FIGS. 1 and 20, the foot 54 lies generally within the profile of the housing 12, so that it aligns with and is movable through the first mat 80 and second mat's 82 respective connecting holes 86 wherein such position is referred to as the "unlocked" position of the foot. The foot 54 can be in open position when the fastening device system 10 is inserted into the first mat 80 and the second mat 82 connecting holes 86. The second position, as shown in FIG. 20 shows the foot 54 extending outwardly from the housing which is referred to as the "locked" position of the foot wherein the foot can be substantially the same thickness of as the housing 12 or in other embodiments larger, or smaller than the housing. This position is generally used to secure the first mat 80 and second mats 82 together, within the preferred embodiment as the pin 40 rotates within the housing 12 the foot 54 can engage at least one of the first mat 80 and second mat's 82 first tab 84 and second tab 85 wherein if there is any misaligned, offset or gap between the two mats the pin can correct that misalignment when put into the first mats 80 and second mat's 82 holes 86 and when "locked" the pin can react against the first and second mats radius lips and pull the two mats together.

In embodiments, the pin 40 can further comprise a seal 44 and a head end 46 which can extend vertically from the shaft 40 respectively. The seal 44 can keep contaminants out of the bore 24 and as the pin 40 rotates up and down along the bore's axis it can move contaminants such as dirt and debris away from the housing's bore. In certain embodiments the seal 44 can have a cut out within the seal to accommodate such as a gasket, O-ring, or the like keeping water and other contaminants out of the bore 24. Beneath the seal 44, the head end 46 can extend vertically to the shaft 50 wherein the head end can help guide the pin along its vertical axis in the housing's 12 bore head 18. The pin 40 can be manufactured of any suitable material such as, for example, carbon steel, aluminum, stainless steel, titanium, plastics or the like.

Referring to FIG. 13, in certain embodiments the pin 40 can provide a locking mechanism 28 when it is in its "locked" position wherein the housing 12 helical channel 26 can comprise a pin locking mechanism on at least one helical channel wherein the pin lock can keep the pin 40 from rotating back to its "unlocked" position. The locking mechanism 28 can push up on the helical shelf 48 wherein when the pin 40 is rotated at least 90° the helical shelf reacts against the pin locking mechanism where the pin locking mechanism acts like a detent or indentation within the helical channel keeping the pin locked at 90°. The helical shelf 48 of the pin 40 engages the helical channel 26 of the housing 12 wherein the helical channel stops the pin from rotating essentially past a 90° rotation wherein the stop is not limited to 90° rotation in other embodiments the rotation can be at least 90° rotation or can be at least 360° rotation. When the user wants to unlock the pin 40 the user can rotate the pin the opposite direction applying a force to overcome the locking mechanism's 28 force on the helical shelf 48. In other embodiments a pin 40 can comprise at least one notch 58 on the top 52 of the foot 54 wherein the notch can be on at least one foot as shown in FIGS. 11 and 14. The notch 58 can be a cutout on the top of the foot 54. At least one rod 78 can be placed between the first half 14 and the second half 16 of the housing 12 wherein the rod can penetrate the notch locking the pin in its "locked" position. The housing 12 can have a slot to allow the rod 78 to move vertical within the housing wherein the rod can move along its axis to be pushed into and pulled out of the notch 58 of the pin 40 thus allowing the pin to be completely locked when in the "locked" position.

Figure 19A:
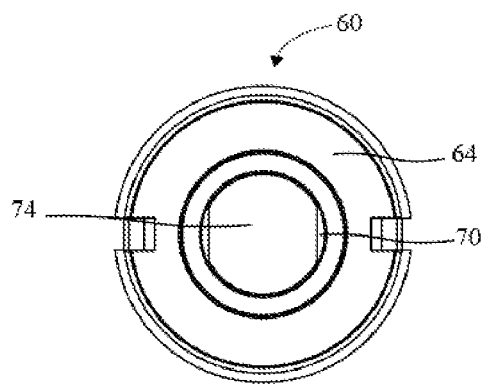
FIG. 19a is a bottom view of a cap of a fastening device system thereof in accordance to one, or more embodiments.
Figure 19B:
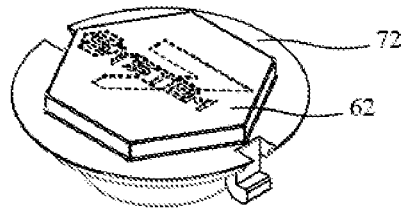
FIG. 19b is an isometric view of a cap of a fastening device system thereof in accordance to one, or more embodiments.
Figure 19C:
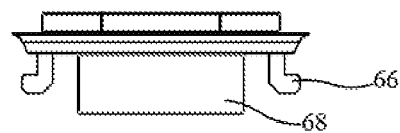
FIG. 19c is a side view of a cap of a fastening device system thereof in accordance to one, or more embodiments.

Referring to FIG. 19*a*-19*c*, the cap 60 can comprise at least one attachment tab 66, a top 62 and a base 64 wherein the base can have a recess 74 for the socket 42 as shown in FIG. 11. The attachment tab 66 can be attached to the housing 12 by the cap lock 22 as shown in FIG. 14. The recess 74 can comprise an anti-rotation mechanism or stop 70 wherein the cap 60 can be placed over the pin 40 and be locked onto the housing 12 by the cap lock 22 wherein the anti-rotation can come into contact with at least one of the flat sides of the socket 42 keeping the pin from rotating. In some embodiments the cap 60 can be omitted or can act as another sealing member keeping contaminants out of the pin 40. In embodiments the cap 60 can have a cap seal 72 wherein the cap seal is configured about the upper bore section 39 of the housing to form at least a substantially fluid tight seal around the pin.

A method of securing a first mat having a first tab with a first connecting hole to a second mat having a second tab with a second connecting hole, wherein the connecting holes have a width and a length that is greater than the width, the method can comprise providing a pin having a head end configured to be manipulated by a user, a shaft with a helical shelf extending from the shaft and a foot end that fits through the first and second connecting holes, but when rotated is wider than the width of the connecting holes. Providing a housing having a first half attachable to a second half to form a housing having an outer surface outline, wherein the housing has a body portion configured to fit through the first and second connecting holes and a lip that extends beyond the circumference of the connecting holes, wherein the housing has a bore extending vertically through the body portion of the housing, the bore having a bottom, a wall, and at least one helical channel in the wall. Placing the pin within the bore such that the helical shelf fits within the helical channel and attaching the first half to the second half. Inserting the housing through the first and second connecting holes. Rotating the pin to compress the first mat to the second mat between the lip and the foot end. Wherein when the pin is rotated to the open closed position the helical shelf and helical channel move the pin up in an axially position tightening the first mat and the second mat together creating a tighter connection between the two mats. Ultrasonically welding a first overmold to the first half and a second overmold to the second half.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claimed is:

1. A fastening device system for connecting a first mat having a first tab with a first connecting hole to a second mat having a second tab with a second connecting hole, wherein the connecting holes have a width and a length that is greater than the width, the fastening device system comprising:
   a housing having a first half attachable to a second half to form an outer surface outline, wherein the housing has a body portion configured to fit through the first and second connecting holes and a lip that extends beyond the circumference of the connecting holes;
   a bore extending vertically through the body portion of the housing, the bore having a bottom, a wall, and at least one helical channel in the wall; and
   a pin having a head end configured to be manipulated by a user, a shaft with at least one helical shelf extending from the shaft such that the shaft is configured to fit within the bore and the helical shelf is configured to fit within the helical channel, and a foot end that fits through the first and second connecting holes, but when rotated is wider than the width of the connecting holes such that when the housing is inserted into the first and second connecting holes and the pin is rotated the first tab is pressed down by the lip and the second tab is pushed up by the foot end,
   wherein the lip has a tapered thru-hole extending between the top of the housing and the bore, wherein the head end of the pin resides substantially within the tapered thru-hole, and
   wherein the housing has an outer surface and wherein the lip has at least one drainage hole extending from the thru-hole to the outer surface of the housing.

2. The fastening device system of claim 1 wherein the first half and the second half can further comprise a first overmold and a second overmold that is ultrasonically welded onto each half respectively.

3. The fastening system of claim 2 further wherein the first overmold the second overmold are manufactured out of glass filled nylon.

4. The fastening device system of claim 1, wherein the foot end and the head end of the pin have a greater circumference than the bore and wherein the head end is substantially flush with the bore and substantially seals the bore when the pin is in a closed position.

5. The fastening device system of claim 1, wherein the foot end has a substantially flat bottom and wherein when the foot end is in the unlocked position it has a foot outline that substantially matches the outer surface outline of the housing.

6. The fastening device system of claim 1 wherein the bore has a cap attached to it and wherein the cap engages with the head end to prevent rotation of the pin relative to the housing.

7. The fastening device system of claim 6, wherein the cap comprises an anti-rotation mechanism and a recess wherein the anti-rotation mechanism is at least one tab within the recess.

8. The fastening device system of claim 6 wherein the cap comprises a top and a base wherein the base has an attachment tab wherein the cap is removably attached to the housing by the attachment tab and a cap lock.

9. The fastening device system of claim 1 wherein the housing provides at least one locking mechanism for the pin.

10. The fastening device system of claim 9 wherein the locking mechanism is located on the helical channel, wherein the helical shelf comes into contact with the pin locking mechanism stopping the pin from rotating back to its unlocked position.

11. The fastening device system of claim 1, wherein the helical shelf of the pin engages the helical channel of the housing wherein the helical channel stops the pin from rotating essentially past a 90° rotation.

12. The fastening device system of claim 1 wherein the pin is manufactured from carbon steel, aluminum or stainless steel.

13. The fastening device system of claim 1 wherein housing is manufactured from high strength plastics.

14. A method of securing a first mat having a first tab with a first connecting hole to a second mat having a second tab with a second connecting hole, wherein the connecting holes have a width and a length that is greater than the width, the method comprising:
   providing a pin having a head end configured to be manipulated by a user, a shaft with a helical shelf extending from the shaft and a foot end that fits through the first and second connecting holes, but when rotated is wider than the width of the connecting holes;
   providing a housing having a first half attachable to a second half to form a housing having an outer surface outline, wherein the housing has a body portion configured to fit through the first and second connecting holes and a lip that extends beyond the circumference of the connecting holes, wherein the housing has a bore extending vertically through the body portion of the housing, the bore having a bottom, a wall, and at least one helical channel in the wall;

placing the pin within the bore such that the helical shelf fits within the helical channel and attaching the first half to the second half;

inserting the housing through the first and second connecting holes; and rotating the pin to compress the first mat to the second mat between the lip and the foot end, wherein the lip has a tapered thru-hole extending between the top of the housing and the bore, wherein the head end of the pin resides substantially within the tapered thru-hole, and wherein the housing has an outer surface and wherein the lip has at least one drainage hole extending from the thru-hole to the outer surface of the housing.

15. The method of claim 14 further comprising ultrasonically welding a first overmold to the first half and a second overmold to the second half.

\* \* \* \* \*